United States Patent
Shwayder

[15] 3,635,674
[45] Jan. 18, 1972

[54] PROCESS FOR RECOVERING REFRACTORY CARBIDE PARTICLES FROM PIECES OF CEMENTED CARBIDES

[72] Inventor: Warren M. Shwayder, Hill House, Goodhue Road, Bloomfield Hills, Mich. 48013

[22] Filed: Mar. 12, 1969

[21] Appl. No.: 806,706

[52] U.S. Cl. .................................................. 23/208, 23/55
[51] Int. Cl. ................. C01b 31/34, C01b 31/30, C01g 51/12
[58] Field of Search .................................................. 23/208

[56] References Cited

UNITED STATES PATENTS 2,848,313   8/1958   Takahashi et al. ................ 23/208 A X
2,912,305   11/1959  Wagner ................................. 23/55 X

*Primary Examiner*—Milton Weissman
*Attorney*—Cullen, Sloman and Cantor

[57] ABSTRACT

Recovering refractory carbide from cemented carbide pieces by immersing the pieces in an amine solution in a sealed vessel, introducing oxygen into the vessel under pressure, while autogenously milling the pieces, thereby dissolving the binder and leaving the carbide in particulate form and thereafter physically separating the particles from the solution.

8 Claims, No Drawings

PROCESS FOR RECOVERING REFRACTORY CARBIDE PARTICLES FROM PIECES OF CEMENTED CARBIDES

BACKGROUND OF INVENTION

The purpose of this process is to reclaim refractory carbides, such as tungsten, titanium and tantalum carbides from scrap cemented or sintered carbides. For example, cemented carbide tool bits, cutters, scrap chips and the like contain valuable carbide particles or powder which is separated from the cementing binder, can be reused to manufacture new cemented carbide articles. The essential problem of such carbide recovery is cost. The cost of separating the carbide powders, that is, disassembling the scrap pieces into their constituent carbide powders and metallic binders must be low enough to compete with newly produced carbide powders to warrant recovery of used carbides.

Prior separation or reclaiming processes have been relatively time consuming, costly and destructive of the equipment used. For example, some prior processes involved high temperatures, physical grinding of the scrap carbide and/or strong acids.

An improvement previously developed by me, disclosed in my U.S. Pat. application Ser. No. 593,675, filed Nov. 14, 1966, now U.S. Pat No. 3,438,730 granted Apr. 15, 1969, generally described leaching away the binders by means of a weak phosphoric acid, at low temperature. This process successfully improved many of the drawbacks and reduced many of the costs of the prior processes.

However, I have now sought to provide an additional process which may be considered to be a further improvement, particularly in the area of reduction of equipment problems. The new process herein uses an amine, thus adopting a different approach from the acid approaches previously used, for separating or leaching away the binder, leaving the original carbide powders in free state, and presenting opportunities for cost reduction due to the use of inexpensive ingredients and particularly elimination of equipment corrosion problems.

SUMMARY OF INVENTION

The invention herein contemplates the use of an amine, as for example, an aqueous ammonia solution, for leaching the cobalt binder from pieces of cemented refractory carbides to thereby liberate the original carbide powders, which then may be physically separated from the liquid. The reaction between the binder and the amine is accomplished in a sealed vessel with the addition of oxygen under relatively low pressure either in free form or in an oxygen-providing compound. The reactions are accelerated and the recovery rate increased by autogenously milling the pieces, such as by vibration of the vessel or by other agitation means, and further by adding a suitable buffering agent.

Since a variety of amines may be used, aside from ammonia, there is an opportunity to select the most inexpensive of available reagents. These are not corrosive to the ferrous materials out of which the vessel, piping, valving and other processing equipment are typically made. Thus, the process does not materially effect the equipment or shorten its life or require additional cleaning thereof, resulting in considerable overall cost savings.

In addition, the cobalt binder materials commonly used may be simply and inexpensively separated out of the solution with the amines for regeneration and reuse of the amines in the process and for separate recovery of the cobalt binder material in metallic form.

As compared to my prior acidic process of the above mentioned patent application, the process herein may have a slightly lower reaction rate, requires some pressurization, and certain of the usable amines have irritant and toxic properties which may require more care in processing. Like my prior process, low temperature is used. For example, the process may be started at room temperature and will tend to increase in temperature but preferably is maintained roughly in the range of about 140° F.

These and further objects and advantages will become apparent upon reading the following description, which specifies the best known mode known to me at this time for performing the process herein.

DETAILED DESCRIPTION

Scrap carbides, such as worn tool bits, cutting bits, grinding and abrasive tool surfacings, are generally formed of powdered or particulate tungsten carbide cemented or sintered together by cobalt in the conventional carbide metallurgy techniques. At times, tantalum or titanium carbide powders are used. Sometimes, nickel appears in the binder.

The process herein causes a reaction between the binder and the amine to form a stable cobalt or nickel complex in solution for thereby leaching away the binder and leaving the carbide particles free and in their original form. Thus, the particles may be physically separated from the liquid solution by conventional filtering or centrifuging.

The cobalt complex may be chemically treated to separate the metallic cobalt from the solution, using conventional chemical processes. This regenerates the amine reagents for reuse in the process, while making the metallic cobalt available for reuse. The chemical recovery of the cobalt is not a part of the invention herein, which rather relates to the process for liberating the carbides.

As a preferred example in carrying out the process herein, miscellaneous various size pieces of cemented carbides are placed within a sealed vessel, containing an aqueous solution of ammonia. The ammonia may vary from about 1.3 to 7.4 mols, as for example, a concentration of about 28% $NH_3$ by weight.

Oxygen is bubbled through the solution at about 5–50 p.s.i., with 20–30 p.s.i. appearing to give optimum results.

The carbide pieces, fully immersed within the solution are rapidly autogenously milled, preferably by vibrating the vessel using a conventional commercial vibrator. For example, a commercial vibrator mill speed of about 1,300 to 1,600 r.p.m. gives the best desired results found to date.

Alternative milling means may be used, such as using a ball mill or a tumbling mill or the like, which causes rapid autogenous milling or striking together of the pieces.

The reaction mechanism appears to be as follows:

The surface of the cobalt oxidizes and reacts with the ammonia forming an oxidized cobalt ammonia complex, according to the reaction: $4\ Co + 3O_2 + 6H_2O\ 24NH_3 \rightarrow 4Co\ (NH_3)_6^{+3} + 12\ (OH)$ As the reaction continues, the cobalt is completely leached from the cemented carbides, leaving the carbide powders or particles in their original or presintered form, since amines do not react with the carbides.

By use of a buffering agent, preferably in the form of salts of a weak acid plus strong base which hydrolyze sufficiently, the yield is maximized due to maintenance of a high free amine concentration. The buffer tends to irreversably increase the complexing reaction.

Useful buffering agents are ammonium acetate or ammonium citrate $((NH_4)_2HC_5H_7O_4)$ or ammonium carbonates, e.g., $(NH_4)\ CO_3$, $NH_4H_4HCO_3$, $Na_2CO_3$, $Na\ Co_3$, or N-substituted analogs.

The temperature used may start at room temperature and since it will inherently rise, may be maintained by cooling at roughly 140° F. Temperature is not critical but is kept relatively low.

Examples of the results of the process, under typical operating conditions are as follows:

| No. | $(NH_4OH)$, M/L | Buffer | Buffer, M/L | Oxygen, p.s.i. | Vibratory mill speed (r.p.m.) | Percent weight loss/hour |
|---|---|---|---|---|---|---|
| 1 | 5.4 | $NHHCo_3$ | .10 | 20 | 1,300 | .487 |
| 2 | 5.4 | Ammonium citrate | .10 | 20 | 1,300 | .507 |
| 3 | 6.55 | ___do___ | .114 | 20 | 1,320 | .065 |
| 4 | 7.4 | ___do___ | .141 | 30 | 1,340 | .574 | where,

M/L equals mols per liter.

Percent weight loss/per hour represents weight milled away per hour as a percentage of the original weight.

The transfer of oxygen to the surface of the cobalt seems to be the principle rate determining step in the reaction. This transfer may be accomplished by use of an oxygen-releasing material, such as hydrogen peroxide, perborates, persulfates, etc., instead of free oxygen. For example, the addition of about 30% $H_2O_2$ seems to give optimum results comparable to the addition of free oxygen, mentioned above.

Generally, an increase in $NH_4OH$ increases the reaction rate, other factors being equal. The same is true of $O_2$ pressure. However, for unknown reasons, the increase in $NH_4OH$ seems to work against a simultaneous increase in $O_2$ pressure. Thus, optimum conditions seem to be achieved at either the lower range of $NH_4OH$ coupled with the higher range of $O_2$ pressure or vice versa.

Although ammonia is described above as preferred, other amines may be substituted, such as:

1. Aliphatic Amines—Primary, secondary or tertiary, e.g., mono, di, and tri ethyl amine or mono-buty-lamine or di-isopropyl amine or cyclohexylamine.
2. Aromatic amines—such as aniline or n-ethylaniline.
3. Heterocyclic amines—such as pyridine, piperidine, indene, diazole, or triazole.
4. Substituted heterocyclic amines such as 2-aminopyridine.
5. Polyamines e.g., ethylene diamine and phenylene diamine.
6. Hydrazine, substituted hydrazines e.g., phenyl hydrazine.
7. Hydroxylamine, oximes.
8. Quaternary amines, tetramethyl ammonium hydroxide.
9. The process may also be conducted with other complex agents, ethylene diamine tetra-acitic acid, amides, nitroso compounds, nitriles, ketones.
10. Also the above is nonaqueous solvents in the liquid amine, or dimethyl formamide, or dimethyl sulfoxide or acetone, etc.

The net result of the process herein is a relatively rapid dissolution of carbide scrap pieces with separation of the original carbide powders or particles from the binder, so that the particles may be physically separated from the binder solution and the cobalt binder may thereafter be chemically reclaimed from its solution. Most importantly, the reagents used are inexpensive, and being noncorrosive are not destructive of the equipment, e.g., vessel, piping, valve, etc.

Having fully described an operative embodiment of this invention, I now claim:

1. A process for separating refractory carbide particles, such as tungsten, tantalum and titanium carbides from binders formed of the class of cobalt and/or nickel, which form varied size pieces of cemented refractory carbides, comprising:

immersing the pieces in a closed vessel containing an amine in an aqueous solution form;

introducing oxygen into the vessel under pressure;

while simultaneously agitating the pieces causing autogenous milling thereof;

thereby causing the binder to react with the amine and dissolve from the pieces and enter into solution, leaving the refractory carbide in its original particulate form;

and thereafter physically separating the particles from the liquid.

2. A process as defined in claim 1, and wherein said oxygen pressure in the vessel is maintained at between about 5 to 50 p.s.i.

3. A process as defined in claim 1, and including adding a buffering agent to the amine liquid solution, said buffering agent comprising a weak acid plus strong base salt, such as from the class of ammonium acetate, citrate and carbonate, and N-substituted analogs.

4. A process as defined in claim 1, and said amine comprising one selected from the class of primary, secondary and tertiary aliphatic amines.

5. A process as defined in claim 1 and said amine comprising one from the class of aromatic amines, such as aniline and N-ethyl aniline.

6. A process as defined in claim 1, and said amine comprising one from the class of heterocyclic amines, such as pyridine, piperidine, indine, diazole, triazole, and 2-aminopyridine.

7. A process as defined in claim 1, and said amine comprising one selected from the class of polyamines, hydrazine, hydroxylamine, and quaternary amines.

8. A process as defined in claim 7, and including maintaining the temperature of said liquid solution in the area of roughly 140° F.

* * * * *